United States Patent
Yoshimura et al.

(10) Patent No.: US 7,753,566 B2
(45) Date of Patent: Jul. 13, 2010

(54) PROJECTION VIDEO DISPLAY SYSTEM

(75) Inventors: Taichi Yoshimura, Osaka (JP); Tadashi Renbutsu, Kasai (JP); Tomonari Watanabe, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 103 days.

(21) Appl. No.: 11/184,876

(22) Filed: Jul. 20, 2005

(65) Prior Publication Data
US 2006/0018124 A1    Jan. 26, 2006

(30) Foreign Application Priority Data
Jul. 21, 2004    (JP) .............................. 2004-212581

(51) Int. Cl.
*F21V 15/01*    (2006.01)
(52) U.S. Cl. .................... 362/373; 362/294; 362/547; 362/218; 362/345
(58) Field of Classification Search ................ 362/373, 362/480, 547, 294, 375, 218, 345; 353/57, 353/58, 60, 61, 119, 52
See application file for complete search history.

(56) References Cited

U.S. PATENT DOCUMENTS

| | | | |
|---|---|---|---|
| 3,433,564 A |  | 3/1969 | Lahr |
| 3,872,235 A | * | 3/1975 | Manly, Jr. .................... 174/359 |
| 4,008,654 A | * | 2/1977 | Stahlhut et al. ............. 454/295 |
| 4,935,758 A | * | 6/1990 | Miyatake et al. ............... 353/31 |
| 6,109,767 A | * | 8/2000 | Rodriguez .................. 362/294 |
| 6,340,237 B1 | * | 1/2002 | Koga et al. .................. 362/294 |
| 6,698,899 B2 | * | 3/2004 | Yamada et al. ................. 353/61 |
| 6,814,446 B2 | * | 11/2004 | Yamada et al. ................. 353/60 |
| 7,014,320 B2 | * | 3/2006 | Shiraishi ...................... 353/57 |
| 7,086,740 B2 | * | 8/2006 | Sample et al. ................. 353/52 |

FOREIGN PATENT DOCUMENTS

| | | |
|---|---|---|
| EP | 1 389 019 A2 | 2/2004 |
| EP | 1 394 602 A1 | 3/2004 |
| GB | 300449 | 11/1928 |
| JP | 61149942 A * | 7/1986 |
| JP | 5-53200 | 3/1993 |
| JP | 05-053200 A | 3/1993 |
| JP | 09-189962 A | 7/1997 |
| JP | 2001-133885 A | 5/2001 |
| JP | 2002-006283 A | 1/2002 |
| JP | 2002-258399 A | 9/2002 |

OTHER PUBLICATIONS

European Search Report dated Nov. 6, 2007, Application No. 05015786.6-1241.
Japanese Office Action dated Nov. 17, 2009, issued in corresponding Japanese patent application No. 2004-212581.
Japanese Office Action dated Jun. 2, 2009, issued in corresponding Japanese patent application No. 2004-212581.

* cited by examiner

*Primary Examiner*—Sharon E Payne
(74) *Attorney, Agent, or Firm*—Westerman, Hattori, Daniels & Adrian, LLP

(57) ABSTRACT

In a projection video display system, display devices are irradiated with light emitted from a light source 1 housed in a body case, and a video image is projected to the outside of the body case. The system includes: a cooling fan for cooling the display devices; and an air passage for guiding air generated by driving the cooling fan to the display devices. Openings for making the display devices communicate with outside air are formed in positions corresponding to at least the display devices in the body case.

2 Claims, 5 Drawing Sheets

PROJECTION VIDEO DISPLAY SYSTEM

BACKGROUND OF THE INVENTION

1. Field of the Invention

The present invention relates to a projection video display system such as a projector.

2. Description of the Related Art

There is a known projection video display system of this kind in which air generated by driving a sirocco fan having an excellent static pressure characteristic is sent to a liquid crystal light bulb as a display device housed in a body case. Since the liquid crystal light bulb generates heat by light emitted from a light source, by sending cooling air from the sirocco fan to the liquid crystal light bulb, the liquid crystal light bulb can be cooled efficiently (refer to Japanese Patent Laid-Open Publication No. H05-53200).

During use of the projection video display system, cooling air constantly flows to the liquid crystal light bulb. Therefore, dusts included in the cooling air may be adhered to the liquid crystal light bulb. In the case where dusts are adhered to the liquid crystal light bulb, deterioration in the quality of a projection video image such as disturbance of a projection image occurs. It is consequently necessary to remove the dusts adhered to the liquid crystal light bulb.

However, the user is not allowed to open the body case housing the liquid crystal light bulb in consideration of maintenance of performance and safety. As a result, the user has to ask a maintenance company to visit for maintenance or has to send the projection video display system to a maintenance company. That is, there is a problem that the work of removing dusts adhered to the liquid crystal light bulb is troublesome.

The present invention has been achieved to solve such a problem and an object of the invention is to provide a projection video display system in which dusts adhered to a display device can be easily removed by the user with a simple configuration.

SUMMARY OF THE INVENTION

The present invention provides a projection video display system for irradiating display devices with light emitted from a light source housed in a body case and projecting a video image to the outside of the body case, including: a cooling fan for cooling the display devices; and an air passage for guiding air generated by driving the cooling fan to the display devices, wherein openings for making the display devices communicate with outside air are formed in positions corresponding to at least the display devices in the body case.

The openings may be formed in the bottom face of the body case. The openings may be closed with detachable closing members.

Effect of the Invention

With the configuration of a first aspect of the present invention, dusts adhered to the display devices can be removed without opening the body case. Consequently, effects are produced such that it is unnecessary to ask a maintenance company for maintenance and the user can easily perform maintenance.

With the configuration of a second aspect of the present invention, the openings are formed in the bottom face of the body case. In a normal use state, the openings are in the blind spot, so that deterioration in appearance can be suppressed.

With the configuration of a third aspect of the present invention, the openings are closed with the closing members except for the time when maintenance is performed. Thus, invasion of dusts from the openings into the body case can be prevented with reliability.

DETAILED DESCRIPTION OF PREFERRED EMBODIMENTS

A projection video display system of an embodiment of the present invention will be described in detail hereinbelow with reference to FIGS. 1 to 5.

Figure 1:
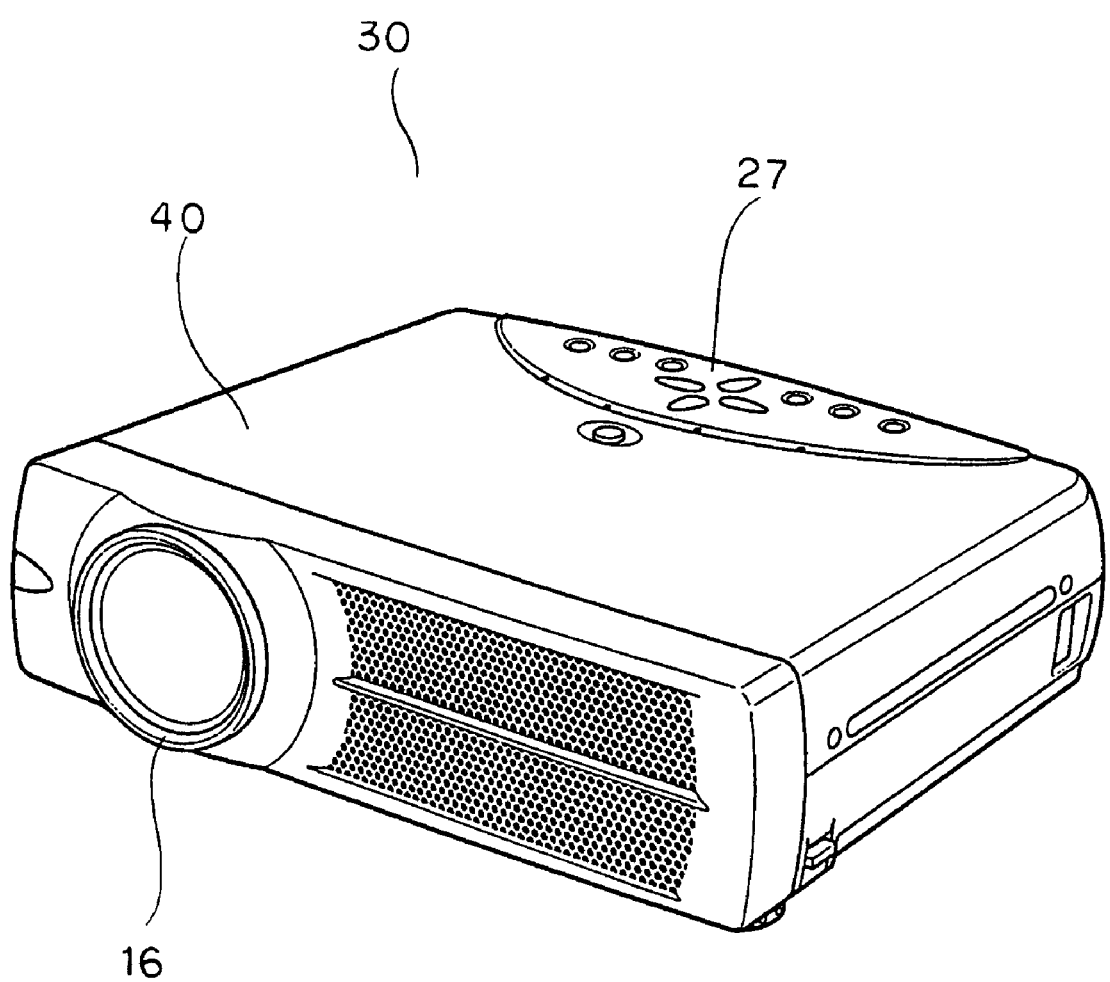
FIG. 1 is an outside perspective view of a projection video display system of an embodiment of the present invention.
Figure 2:
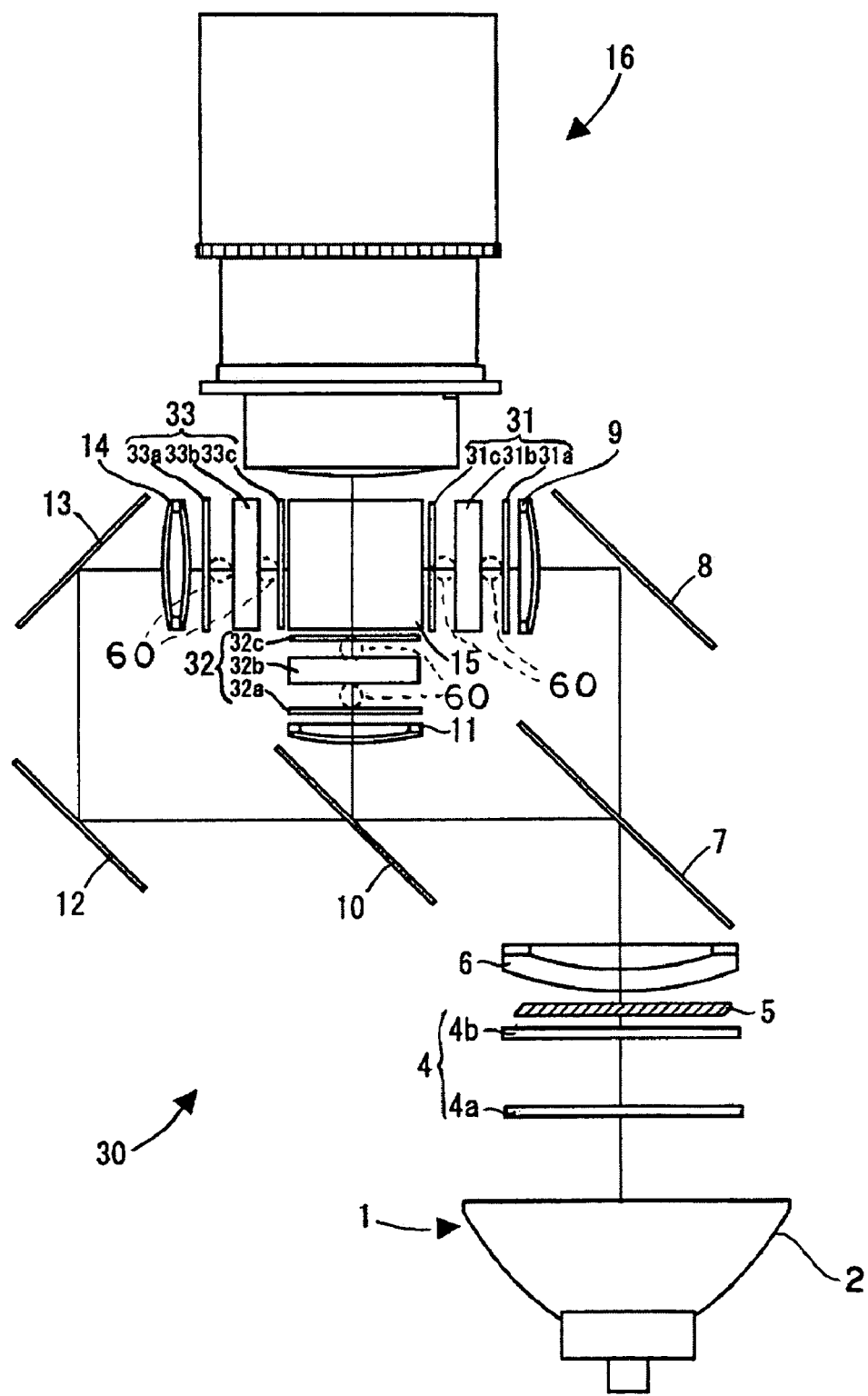
FIG. 2 is a configuration diagram showing an optical system of the projection video display system.

FIGS. 1 and 2 are diagrams showing a three-chip liquid crystal projector 30 as a projection video display system of the embodiment. In a body case 40 having a top face in which an operation part 27 is formed, an optical system including a light source 1 is housed. A light emitting part of the light source 1 is constructed by an extra-high pressure mercury lamp, a metal halide lamp, a xenon lamp, or the like. Light emitted from the light emitting part is converted to parallel light by a parabola reflector 2. The parallel light goes out and is led to an integrator lens 4.

The integrator lens 4 is constructed by a pair of lenses (fly-eye lenses) 4a and 4b. Each of the lenses leads the light emitted from the light source 1 to all of surfaces of liquid crystal light bulbs 31, 32, and 33 described later. By the operation, partial brightness unevenness existing in the light source 1 is averaged, and the light amount difference between the center of the screen and the peripheral part is reduced. The light that goes out from the integrator lens 4 passes through a polarization converter 5 and a condenser lens 6 and, after that, is led to a first dichroic mirror 7.

The first dichroic mirror 7 transmits light in a red wavelength band and reflects light in a wavelength band of cyan (green+blue). The light in the red wavelength band passed through the first dichroic mirror 7 is reflected by a reflection mirror 8 and its optical path is changed. The red light reflected by the reflection mirror 8 passes through a lens 9 and the liquid crystal light bulb 31 as a transmission display device for red light, thereby being subjected to light modulation. The light in the cyan wavelength band reflected by the first dichroic mirror 7 is led to a second dichroic mirror 10.

The second dichroic mirror 10 transmits light in a blue wavelength band and reflects light in a green wavelength band. The light in the green wavelength band reflected by the second dichroic mirror 10 is led to the liquid crystal light bulb 32 as a transmission display device for green light via a lens 11. The light passes through the liquid crystal light bulb 32, thereby being subjected to light modulation. The light in the blue wavelength band, that has passed through the second dichroic mirror 10 is led via total reflection mirrors 12 and 13 and a lens 14 to the liquid crystal light bulb 33 as a transmission display device for blue light. The light passes through the liquid crystal light bulb 33, thereby being subjected to light modulation.

The liquid crystal light bulbs 31, 32, and 33 are constructed by incident-side sheet polarizers 31a, 32a, and 33a, panels 31b, 32b, and 33b each formed by sealing liquid crystal between a pair of glass substrates (on which pixel electrodes and an orientation film are formed), and outgoing-side sheet polarizers 31c, 32c, and 33c, respectively.

The modulation light (video light of the colors) modulated by passing through the liquid crystal light bulbs 31, 32, and 33 is combined by a cross dichroic prism 15, thereby obtaining color video image light. The color video image light is enlarged and projected by a projection lens 16 to form an image on a not-shown screen.

There is the possibility that the liquid crystal light bulbs 31, 32, and 33 generate heat due to the light emitted from the light source 1 and their performance deteriorates. Consequently, cooling air is sent by a cooling fan 5 in FIG. 3 to the liquid crystal light bulbs 31, 32, and 33 to cool the liquid crystal light bulbs 31, 32, and 33. Concretely, the air generated by driving the cooling fan 5 is guided to the liquid crystal light bulb 32 (31, 33) via a cooling duct 55 forming an air passage 50 shown in FIG. 3. With the air, the liquid crystal light bulbs 31, 32, and 33 are cooled.

Since the cooling air always flows to the liquid crystal light bulbs 31, 32, and 33 as described above, there is the possibility that dusts included in the cooling air are adhered to the liquid crystal light bulbs 31, 32, and 33. When dusts are adhered to the liquid crystal light bulbs 31, 32, and 33, deterioration in the quality of a projected video image, such as disturbance in the projected video image occurs. It is therefore necessary to remove the dusts adhered to the liquid crystal light bulbs 31, 32, and 33.

Figure 3:
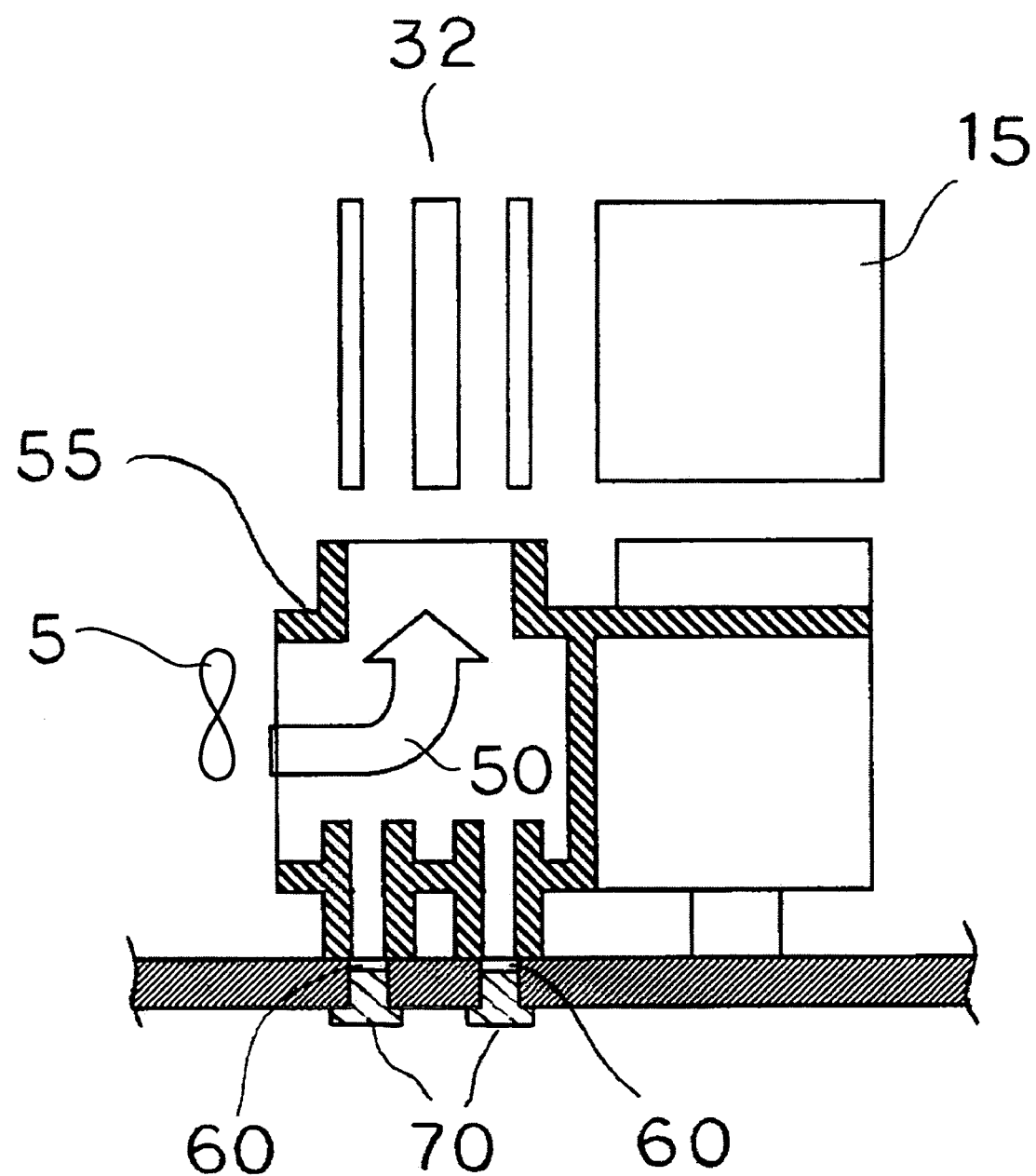
FIG. 3 is across section of an air passage in the projection video display system.
Figure 4:
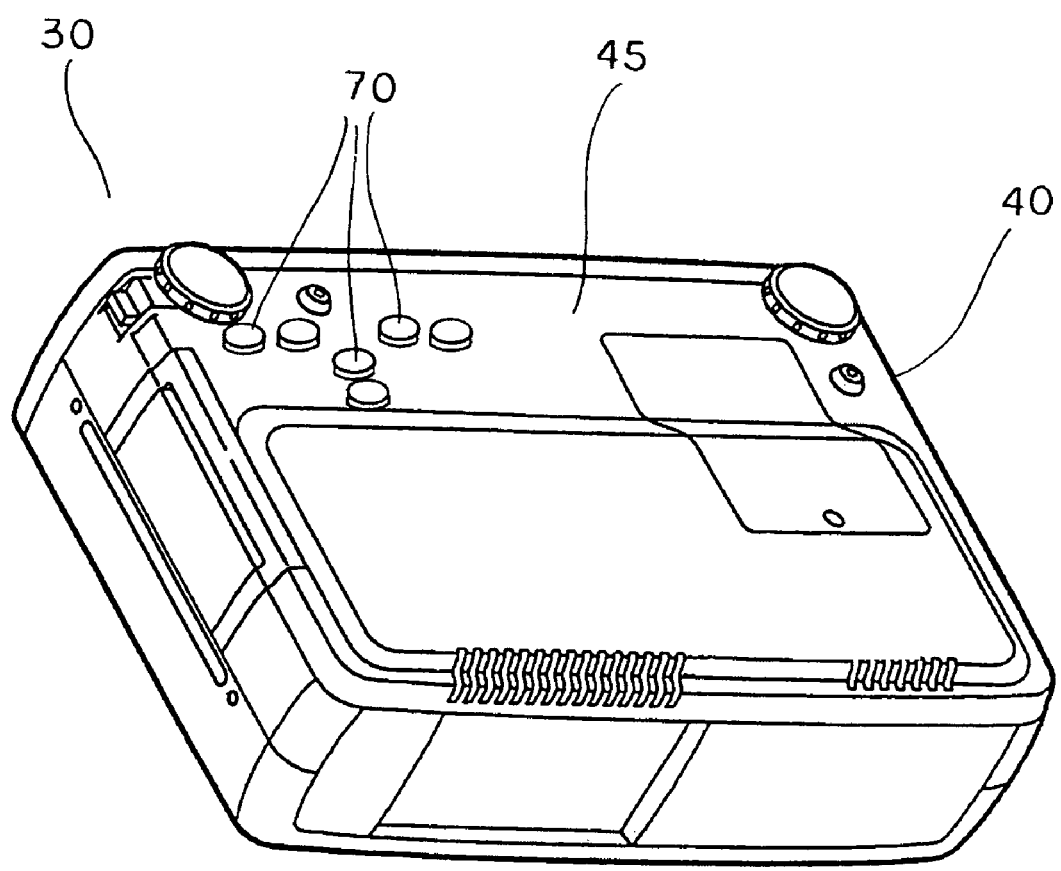
FIG. 4 is a rear view of the projection video display system.

As a countermeasure, in the embodiment, openings 60 for making the air passage 50 communicate with the outside air are formed in a bottom face 45 of the body case 40 in positions corresponding to the liquid crystal light bulbs 31, 32, and 33 as shown in FIGS. 2 and 3. The openings 60 are closed with detachable closing members 70.

Figure 5:
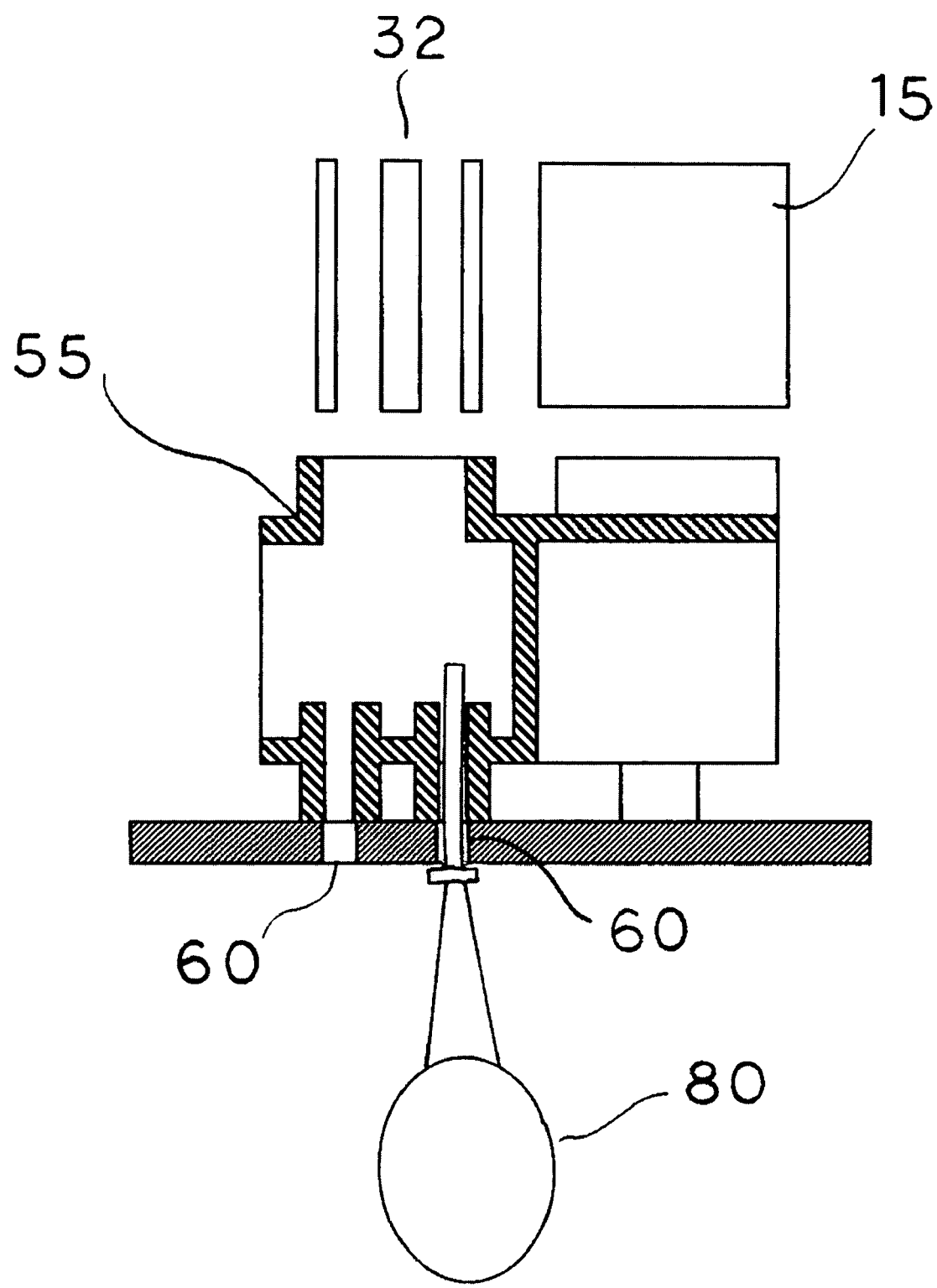
FIG. 5 is an outside view of a blower as a cleaning tool of the projection video display system.

With this configuration, when the user recognizes deterioration in the quality of a projected video image such as disturbance in the projected video image, first, the closing members 70 are detached. Next, for example, as shown in FIG. 5, a balloon-type blower 80 or the like for cleaning a camera or the like is inserted in the opening 60, and air from the blower 80 is blown to the liquid crystal light bulbs 31, 32, and 33. With the air, the dusts adhered to the liquid crystal light bulbs 31, 32, and 33 can be removed.

At this time, by displaying a projected video image in a painted manner, leakage of light that is reflected irregularly by the dusts adhered to the liquid crystal light bulbs 31, 32, and 33 can be easily visually recognized. Consequently, removal of the dusts adhered to the liquid crystal light bulbs 31, 32, and 33 can be easily visually recognized.

By adjusting the length of the tip portion of the blower 80 so that the exhaust nozzle comes closer to the liquid crystal light bulb 32, the dusts can be removed more easily. Also by increasing the strength of the cooling air of the cooling fan, removal of dusts is facilitated.

By providing a gap between the blower 80 and the opening 60 so that the position of the tip portion of the blower 80 can be freely adjusted, dusts can be removed from all of the areas of the liquid crystal light bulbs 31, 32, and 33.

In such a manner, dusts adhered to the liquid crystal light bulbs 31, 32, and 33 can be removed without opening the body case 40. Consequently, unlike the conventional technique, it is unnecessary to ask a maintenance company for maintenance, and the user can easily perform maintenance.

Moreover, it is unnecessary to open the body case 40 in order to perform maintenance. Maintenance can be performed in a state where current is passed to the projection video display system. Therefore, maintenance can be performed in a state where a projected video image is displayed in a painted manner, so that a maintenance work can be simplified.

The openings 60 are formed in the bottom face 45 of the body case 40. Therefore, in a normal use state of the projector, the openings 60 are not seen, so that deterioration in appearance can be suppressed. Even in the case where the user forgets about attaching the closing members 70 for closing the openings 60, invasion of dusts from the openings 60 into the body case 40 can be prevented.

The openings 60 are closed with the closing members 70 except for the time of performing maintenance of removing dusts. Consequently, invasion of dusts from the openings 60 into the body case 40 can be prevented with reliability and entry of outside light from the openings 60 can be also prevented.

Although the openings 60 are formed in the bottom face 45 of the body case 40 in the embodiment, the openings 60 may be formed in another face of the body case 40.

Although the openings 60 are formed only in positions corresponding to the liquid crystal light bulbs 31, 32, and 33 in the embodiment, the opening 60 may be also formed in a position corresponding to the integrator lens 4 or the like. As a cleaning tool of removing dusts adhered to the liquid crystal light bulbs 31, 32, and 33, a spray-type air duster or the like may be used.

Although the projector of the embodiment of the invention is the three-chip liquid crystal projector of LCD, the invention is not limited to the projector of this type. The configuration of the present invention may also be used for a projector of a DLP (Digital Light Processing) (registered trademark of Texas Instruments Inc. (TI)).

What is claimed is:

1. A projection video display system for dividing light emitted from a light source housed in a body case into three colors of R, G, B, modulating each of the divided colors, combining the modulated colors and projecting a video image to the outside of the body case, comprising:
    display devices that are irradiated with the light divided into the three colors, the display devices modulating each of the divided colors that pass through the respective display devices;
    a cooling fan for cooling the display devices;
    an air passage for guiding air generated by driving the cooling fan to the display devices;
    openings formed in a bottom face of the body case at positions corresponding to each of said display devices for making the display devices communicate with outside air; and
    detachable closing members that fit in said openings to open said openings in a detached state and to close said openings in an attached state,
    wherein the detachable closing members are detached from the openings to the outside of the body case and the detachable closing members are detached from the cooling fan separately.

2. The projection video display system according to claim 1, further comprising a cleaning tool for removing dust adhered to the display devices by blowing air, the cleaning tool being insertable into the openings formed in the bottom face of the body case.

* * * * *